United States Patent
Lee et al.

(10) Patent No.: US 8,503,379 B2
(45) Date of Patent: Aug. 6, 2013

(54) APPARATUS AND METHOD FOR PRECODING BY MIDAMBLE IN MULTIPLE INPUT MULTIPLE OUTPUT WIRELESS COMMUNICATION SYSTEM

(75) Inventors: Sung-Ho Lee, Seoul (KR); Keun-Chul Hwang, Yongin-si (KR); Sung-Woo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 807 days.

(21) Appl. No.: 12/424,305

(22) Filed: Apr. 15, 2009

(65) Prior Publication Data

US 2009/0262694 A1    Oct. 22, 2009

(30) Foreign Application Priority Data

Apr. 17, 2008    (KR) .................. 10-2008-0035729

(51) Int. Cl.
*H04W 4/00*    (2009.01)
(52) U.S. Cl.
USPC ........................................ 370/329
(58) Field of Classification Search
USPC ........................................ 370/329
See application file for complete search history.

(56) References Cited

U.S. PATENT DOCUMENTS

| | | | |
|---|---|---|---|
| 7,933,564 B2 * | 4/2011 | Le Nir et al. ................. | 455/101 |
| 2007/0165738 A1 | 7/2007 | Barriac et al. | |
| 2007/0286304 A1 | 12/2007 | Kim et al. | |
| 2008/0063115 A1 * | 3/2008 | Varadarajan et al. ......... | 375/299 |
| 2008/0132282 A1 * | 6/2008 | Liu et al. .................... | 455/562.1 |
| 2008/0227495 A1 * | 9/2008 | Kotecha et al. ............ | 455/562.1 |
| 2009/0116570 A1 * | 5/2009 | Bala et al. ..................... | 375/260 |
| 2009/0147880 A1 * | 6/2009 | Wennstrom et al. .......... | 375/267 |
| 2009/0154588 A1 * | 6/2009 | Chen et al. .................... | 375/267 |
| 2010/0220675 A1 * | 9/2010 | Chun et al. .................... | 370/329 |
| 2010/0310000 A1 * | 12/2010 | Ko et al. ....................... | 375/260 |
| 2011/0002290 A1 * | 1/2011 | Kim et al. ..................... | 370/329 |
| 2011/0080968 A1 * | 4/2011 | Seo et al. ...................... | 375/267 |

FOREIGN PATENT DOCUMENTS

WO    2008/009157 A1    1/2008

* cited by examiner

*Primary Examiner* — Asad Nawaz
*Assistant Examiner* — Saad A Waqas
(74) *Attorney, Agent, or Firm* — Jefferson IP Law, LLP (57) ABSTRACT

A method and apparatus for performing codebook-based precoding in a Multiple Input Multiple Output (MIMO) wireless communication system are provided. In a method for operating a Base Station (BS) in a MIMO wireless communication system, a reference signal including pilot signals, which are divided by a predefined number of bands and are multiplied by respective codes in a codebook, is transmitted. One or more Mobile Stations (MSs) destined for spatial multiple access are selected using an index of a band and CQI of the band corresponding to the index, which are fed back from one or more MSs. A precoding matrix is generated to process data streams of the selected one or more MSs.

12 Claims, 6 Drawing Sheets

APPARATUS AND METHOD FOR PRECODING BY MIDAMBLE IN MULTIPLE INPUT MULTIPLE OUTPUT WIRELESS COMMUNICATION SYSTEM

PRIORITY

The present application claims the benefit under 35 U.S.C. §119(a) of a Korean patent application filed in the Korean Intellectual Property Office on Apr. 17, 2008 and assigned Serial No. 10-2008-0035729, the entire disclosure of which is hereby incorporated by reference.

BACKGROUND OF THE INVENTION

1. Field of the Invention

The present invention relates to a Multiple Input Multiple Output (MIMO) wireless communication system. More particularly, the present invention relates to an apparatus and method for precoding by a midamble in a MIMO wireless communication system.

2. Description of the Related Art

A Multiple Input Multiple Output (MIMO) technique using multiple transmit/receive (TX/RX) antennas is being considered as a technique to satisfy an increasing demand for high-speed and high-quality data transmission. Since the MIMO technique performs communication using multiple streams via multiple antennas, it may greatly increase the channel capacity in comparison with the case of using a single antenna. For example, if a transmitter/receiver uses M number of TX/RX antennas, the channels of the antennas are independent of one another, the bandwidth and the total TX power are fixed, and the average channel capacity increases M times in comparison with the case of using a single antenna.

The MIMO technique is classified into a closed-loop MIMO technique and an open-loop MIMO technique according to whether channel information is fed back to a transmitter. Both the closed-loop MIMO technique and the open-loop MIMO technique are applicable to a Single-User (SU) MIMO technique that transmits a signal to only one receiver per unit of time. However, the closed-loop MIMO technique is also applicable to a Multi-User (MU) MIMO technique that transmits a signal to a plurality of receivers simultaneously. Thus, in a MU MIMO system, a transmitter obtains channel information for receivers.

The channel information may be fed back to the transmitter in various forms. Examples of the form of the channel information are quantized information of a channel coefficient estimated by the receiver and an index corresponding to an optimal code selected by the receiver from a codebook negotiated between the receiver and the transmitter. If the quantized channel coefficient is fed back to the transmitter, the channel information may be accurately represented so that the transmitter may perform a complex accurate MU MIMO technique. However, the feedback causes a large overhead. On the other hand, if the codebook index is fed back to the transmitter, the channel information is relatively inaccurate, but the feedback causes a small overhead.

If the codebook index is used, that is, if a codebook-based precoding technique is used, Mobile Stations (MSs) select suitable codes from the codebook and a Base Station (BS) generates a precoding matrix by using the codes selected by the MSs. For example, if a Discrete Fourier Transform (DFT) codebook is used, each of the MSs computes a correlation matrix of an estimated channel matrix and selects a code that is most similar to a dominant eigenvector of the correlation matrix. Thereafter, each of the MSs feeds back the channel information and the index of the selected code to the BS.

As described above, if the codebook-based precoding technique is used, feedback of the codebook index by the MS causes overhead and the code selecting operation requires an operation that computes the dominant eigenvector of the correlation matrix and compares the dominant eigenvector with the codes. Thus, there is a need to reduce computational complexity of the MS and the overhead caused by the codebook index feedback.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing overhead when performing codebook-based precoding in a Multiple Input Multiple Output (MIMO) wireless communication system.

Another aspect of the present invention is to provide an apparatus and method for performing codebook-based precoding without feedback of a codebook index in a MIMO wireless communication system.

Another aspect of the present invention is to provide an apparatus and method for performing codebook-based precoding using a midamble including pilot signals multiplied by a code of a codebook in a MIMO wireless communication system.

In accordance with an aspect of the present invention, a method for operating a Base Station (BS) in a MIMO wireless communication system is provided. The method includes transmitting reference signals including pilot signals that are divided by a predefined number of bands and are multiplied by respective codes in a codebook, selecting one or more Mobile Stations (MSs) destined for spatial multiple access using an index of a band and Channel Quality Information (CQI) of the band corresponding to the index, which are fed back from one or more MSs, and generating a precoding matrix for processing data streams of the selected one or more MSs.

In accordance with another aspect of the present invention, a method for operating an MS in a MIMO wireless communication system is provided. The method includes receiving a reference signal including pilot signals that are divided by a predefined number of bands and are multiplied by respective codes in a codebook, measuring a band-by-band channel quality by using the reference signal, and feeding back CQI and an index of the band with a maximum channel quality value to a BS.

In accordance with another aspect of the present invention, an apparatus for a BS in a MIMO wireless communication system is provided. The apparatus includes a transmitter for transmitting a reference signal including pilot signals that are divided by a predefined number of bands and are multiplied by respective codes in a codebook, a scheduler for selecting one or more MSs destined for spatial multiple access by using an index of a band and CQI of the band corresponding to the index, which are fed back from one or more MSs, and a generator for generating a precoding matrix for processing data streams of the selected one or more MSs.

In accordance with yet another aspect of the present invention, an apparatus for an MS in a MIMO wireless communication system is provided. The apparatus includes a receiver for receiving a reference signal including pilot signals that are divided by a predefined number of bands and are multiplied by the respective codes in a codebook, an estimator for measuring a band-by-band channel quality by using the reference signal, and a processor for generating control information including CQI and an index of the band with the maximum channel quality value, which are to be transmitted to a BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a scheme for performing codebook-based precoding without feedback of a codebook index in a Multiple Input Multiple Output (MIMO) wireless communication system. The following description is made in the context of an Orthogonal Frequency Division Multiplexing (OFDM)/Orthogonal Frequency Division Multiple Access (OFDMA) wireless communication system, to which the present invention is not limited. Thus, it should be clearly understood that the present invention is also applicable to any other wireless communication systems.

In order to perform codebook-based precoding without feeding back a codebook index, a Base Station (BS) according to an exemplary embodiment of the present invention transmits a midamble including pilot signals multiplied by the respective codes in the codebook. Herein, the pilot signals multiplied by the respective codes are divided on a band-by-band basis and a TX band varies per frame. That is, the midamble is a reference signal occupying a predefined time period, which is divided by a predefined number of frequency bands, and each band signal included in the midamble is multiplied by each code.

Figure 1:
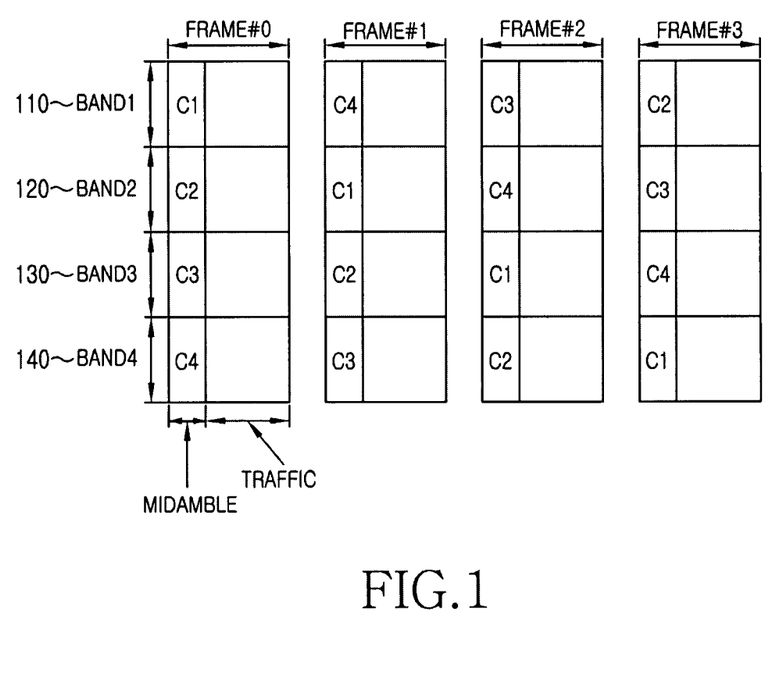
FIG. 1 illustrates an example of the transmission of a midamble in a MIMO wireless communication system according an exemplary embodiment of the present invention.

For example, if four codes are available, the midamble is generated and transmitted as illustrated in FIG. 1. FIG. 1 illustrates an example of the transmission of a midamble in a MIMO wireless communication system according to an exemplary embodiment of the present invention. As illustrated in FIG. 1, in the $0^{th}$ frame, a pilot signal multiplied by a first code C1, a pilot signal multiplied by a second code C2, a pilot signal multiplied by a third code C3, and a pilot signal multiplied by a fourth code C4 are transmitted respectively through a first band 110, a second band 120, a third band 130, and a fourth band 140. Then, in the first frame, the midamble is transmitted after being shifted cyclically by the code. That is, in the first frame, a pilot signal multiplied by the first code C1, a pilot signal multiplied by the second code C2, a pilot signal multiplied by the third code C3, and a pilot signal multiplied by the fourth code C4 are transmitted respectively through the second band 120, the third band 130, the fourth band 140, and the first band 110. Thereafter, in the second frame and the third frame, the midamble is transmitted after being shifted cyclically on a code-by-code basis. Herein, the pilot signal multiplied by the code has as many elements as the number of TX antennas and each of the elements is transmitted through the corresponding TX antenna.

Accordingly, using the midamble, Mobile Stations (MSs) estimate a band-by-band effective channel matrix and measure a band-by-band channel quality. Then, the MSs transmit a Channel Quality Information (CQI) and an index of the band with the maximum channel quality value to the BS. Thus, the MSs do not need to know codebook information used in the BS, and do not need to perform a codebook selecting operation.

Upon receiving the CQI and the index of the band from the MSs, the BS classifies the feedback information on a band/frame basis and determines MSs destined for spatial multiple access in each band. Herein, the frame-based classification is substantially the same as the code-based classification. For example, if four MSs should be selected in the first band, the BS selects four MSs with the best band-by-band channel quality among the MSs, which have fed back the CQI for the first band respectively in the $0^{th}$ to third frames, as MSs destined for spatial multiple access through the first band. Then, the BS generates a precoding matrix by using the codes used in the first band of the $0^{th}$ to third frames. The precoding matrix may be generated as shown in Equation (1) by using a matrix having the Hermitian vectors of codes as a column vector.

$$P = G^H(GG^H)^{-1}, G = \begin{bmatrix} c_1^H \\ c_4^H \\ c_3^H \\ c_2^H \end{bmatrix} \quad (1)$$

where P denotes a precoding matrix, G denotes a matrix having the Hermitian vectors of codes as a column vector, and $C_k$ denotes the $k^{th}$ code (k: 1, 2, 3 and 4).

In Equation (1), the precoding matrix is generated by the Hermitian vectors of codes. However, according to a code defining mode, the precoding matrix may be generated not by the Hermitian vectors of codes but by the codes themselves. That is, if the codes are defined as the Hermitian vectors of a channel, the Hermitian vectors of codes is used as shown in Equation (1). In contrast, if the codes are defined as a channel, the codes themselves may be used.

Figure 2:
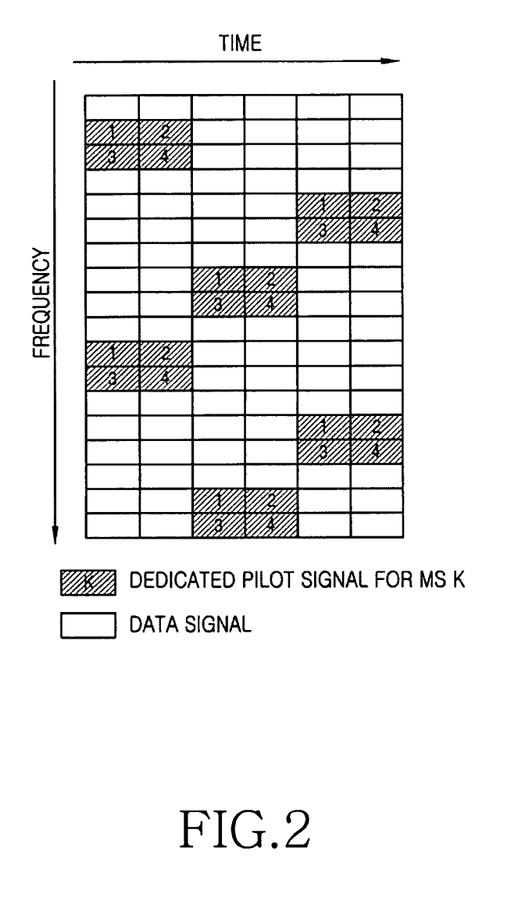
FIG. 2 illustrates transmission of a data signal and a dedicated pilot signal in a Multiple Input Multiple Output (MIMO) wireless communication system according an exemplary embodiment of the present invention.

Thereafter, the BS transmits data streams multiplied by the precoding matrix to a plurality of TX antennas. Herein, the MSs may not estimate an effective channel through a general pilot signal because the MSs do not know which code is applied. However, the MSs must obtain the effective channel information in order to detect a signal sequence. Thus, for the effective channel estimation of the MSs, the BS simultaneously transmits data signals and dedicated pilot signals for the respective MSs. Herein, the dedicated pilot signals are pilot signals multiplied by the codes corresponding to the respective MSs, and are transmitted in-band. For example, the data signals and the dedicated pilot signals are transmitted as illustrated in FIG. 2. FIG. 2 illustrates transmission of a data signal and a dedicated pilot signal in a MIMO wireless communication system according to an exemplary embodiment of the present invention. Accordingly, each of the MSs estimates an effective channel through a dedicated pilot signal allocated to itself and detects a data signal.

Hereinafter, with reference to FIGS. 3 and 4, a detailed description will be given of the operation processes of the BS and the MS that perform a precoding operation as described above.

Figure 3:
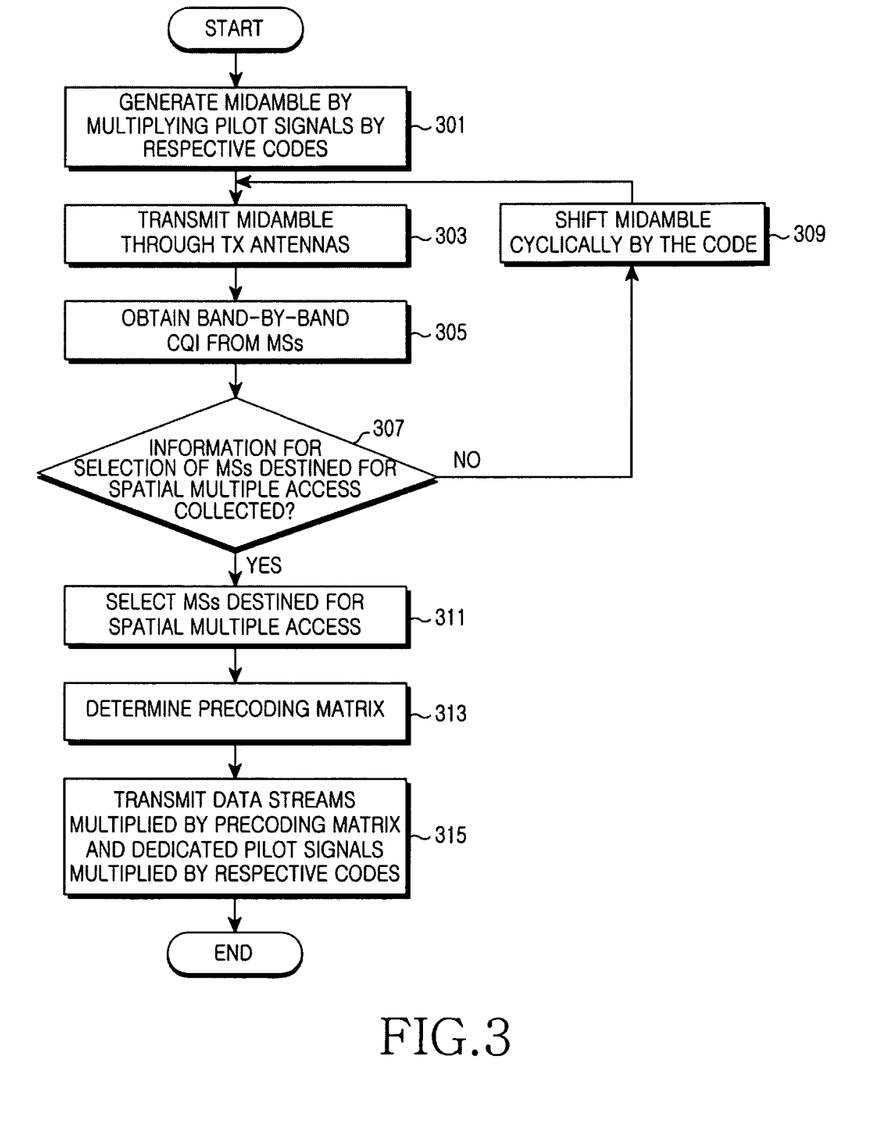
FIG. 3 is a flowchart illustrating an operation process of a Base Station (BS) in a MIMO wireless communication system according to an exemplary embodiment of the present invention.

FIG. 3 is a flowchart illustrating an operation process of a BS in a MIMO wireless communication system according to an exemplary embodiment of the present invention.

Referring to FIG. 3, in step 301, the BS generates a midamble by multiplying pilot signals by respective codes. That is, in order to select MSs for multiple access and generate a precoding matrix, the BS generates a reference signal by multiplying the respective codes by the pilot signals divided by a predefined number of bands. Herein, each of the pilot signals multiplied by the respective codes has as many elements as the number of TX antennas.

Thereafter, in step 303, the BS transmits the preamble through the TX antennas in a predefined interval of a frame. Herein, the BS transmits the elements, included in the pilot signals in the midamble, through the corresponding TX antennas.

Thereafter, in step 305, the BS obtains band-by-band CQI fed back from the MSs. That is, the BS obtains the CQI measured through the midamble. Herein, the CQI is fed back together with an index of the band, and the BS receives an index and the CQI of the band corresponding to the index from each MS.

Thereafter, in step 307, the BS determines whether information for selection of MSs destined for spatial multiple access is collected. For example, if four MSs are selected in a specific band, the CQI of the MSs for at least four codes is required in the specific band.

If the information for the selection of the MSs is not collected, the BS proceeds to step 309. In step 309, the BS shifts the midamble cyclically by the code. Thereafter, the BS returns to step 303. That is, the BS transmits the midamble varying per frame as illustrated in FIG. 1.

On the other hand, if the information for the selection of the MSs is collected in step 307, the BS proceeds to step 311. In step 311, the BS selects the MSs destined for spatial multiple access. That is, the BS classifies the CQI on a band/frame basis and selects the MSs having the best code-by-code channel quality in the same band as the MSs destined for spatial multiple access in the band. Herein, the BS selects the MSs destined for spatial multiple access in all the bands, or selects the MSs destined for spatial multiple access only in some bands.

Thereafter, in step 313, the BS generates a precoding matrix for processing data streams for the selected MSs. The BS generates the precoding matrix using the codes in the band when each of the selected MSs feeds back an index of the band. Herein, the precoding matrix is generated as shown in Equation (1) by using a matrix having codes or the Hermitian vectors of the codes as a column vector.

Thereafter, in step 315, the BS transmits the data streams multiplied by the precoding matrix and the dedicated pilot signals multiplied by the respective codes. Herein, the dedicated pilot signals are to estimate the effective channels of the MSs, and are transmitted in an in-band mode. For example, the data streams and the dedicated pilot signals are transmitted as illustrated in FIG. 2.

Figure 4:
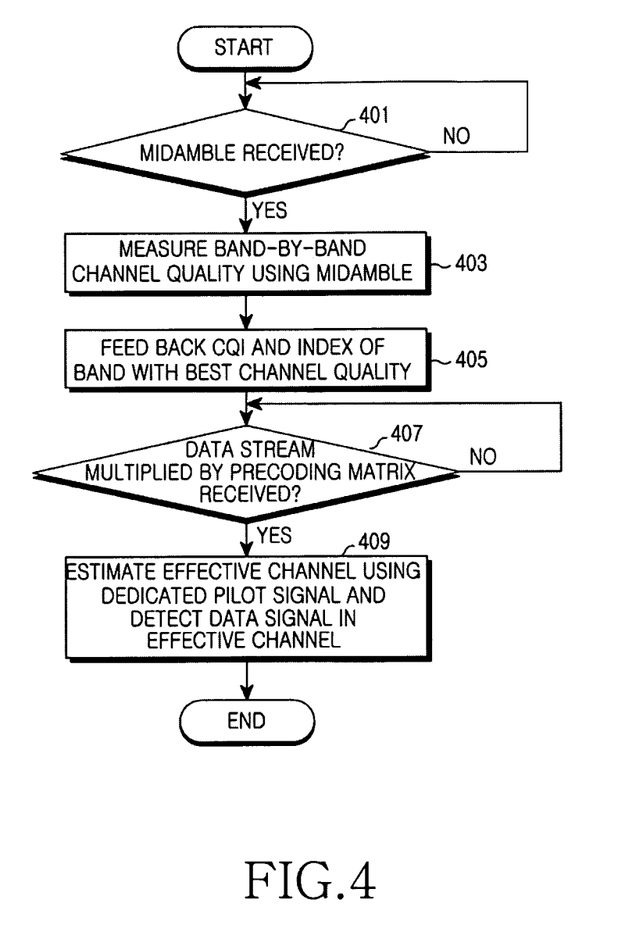
FIG. 4 is a flowchart illustrating an operation process of a Mobile Station (MS) in a MIMO wireless communication system according to an exemplary embodiment of the present invention.

FIG. 4 is a flowchart illustrating an operation process of an MS in a MIMO wireless communication system according to an exemplary embodiment of the present invention.

Referring to FIG. 4, in step 401, the MS determines whether a midamble is received. Herein, the midamble includes pilot signals multiplied by respective codes. That is, the MS determines whether a reference signal, obtained by multiplying the respective codes by the pilot signals divided by a predefined number of bands, is received.

If the midamble is received, the MS proceeds to step 403. In step 403, the MS measures a band-by-band channel quality using the midamble. That is, the MS generates a band-by-band effective channel matrix using the midamble and measures a band-by-band channel quality using the effective channel matrix.

Thereafter, in step 405, the MS feeds back CQI and an index of the band with the maximum channel quality value to the BS. Herein, the CQI may be a Signal to Interference and Noise Ratio (SINR), a Signal to Noise Ratio (SNR), or a Carrier to Interference and Noise Ratio (CINR).

Thereafter, in step 407, the MS determines whether a data stream multiplied by a precoding matrix is received. Herein, a dedicated pilot signal is received together with the data stream. For example, the data stream and the dedicated pilot signal are received as illustrated in FIG. 2.

If the data stream multiplied by the precoding matrix is received, the MS proceeds to step 409. In step 409, the MS detects a data signal. That is, the MS estimates an effective channel using a dedicated pilot signal allocated to itself, and detects a data signal of a stream allocated to itself in the estimated effective channel. In other words, the MS compensates distortion on the received data signal based on the estimated effective channel. For example, if the MS uses a linear receiving technique, it generates a linear receiving filter for the effective channel and multiplies the linear receiving filter by a signal sequence received through a plurality of RX antennas.

Hereinafter, with reference to FIGS. 5 and 6, a description will be given of the structures of a BS and an MS that perform a precoding operation as described above.

Figure 5:
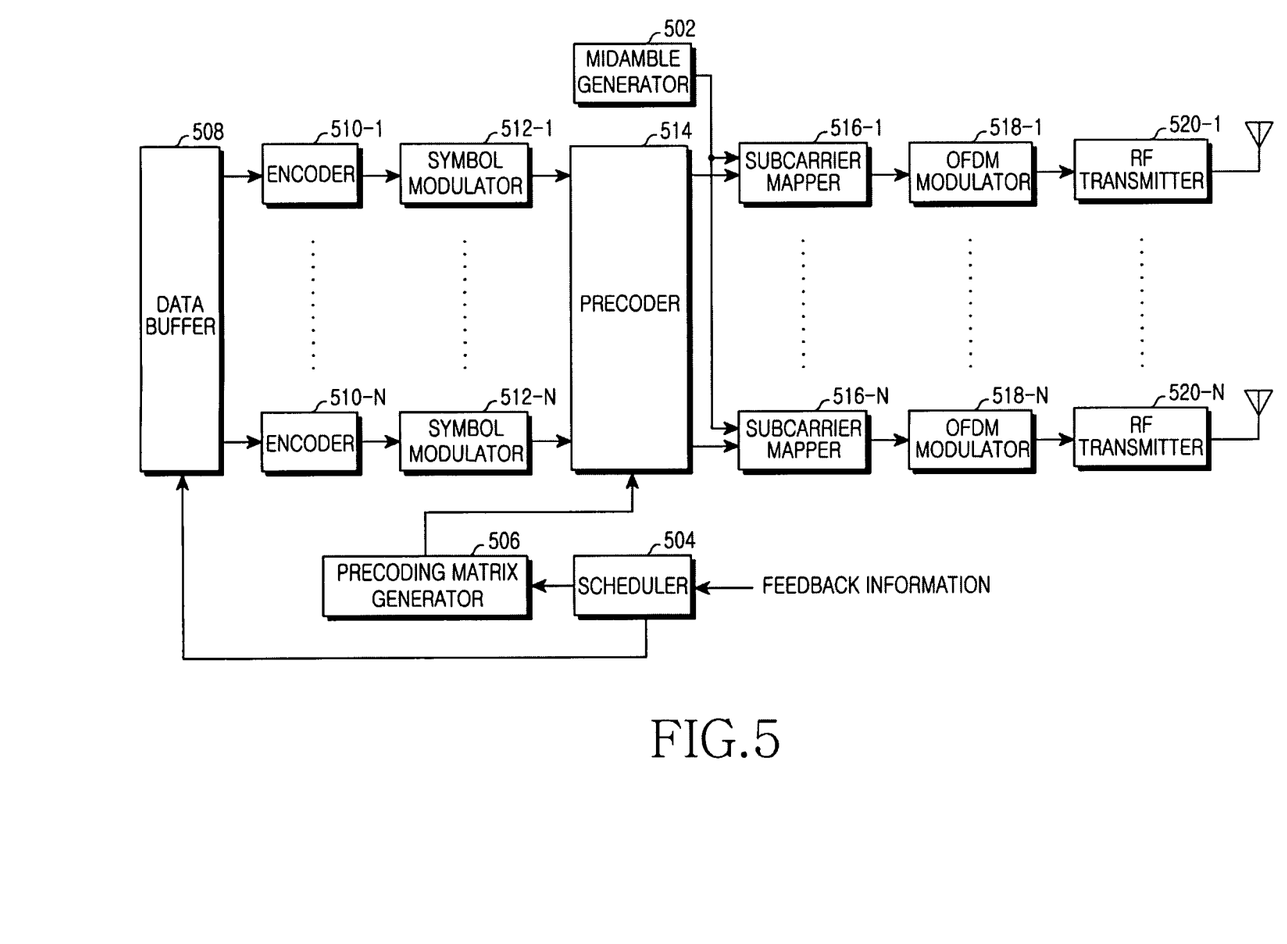
FIG. 5 is a block diagram of a BS in a MIMO wireless communication system according to an exemplary embodiment of the present invention.

FIG. 5 is a block diagram of a BS in a MIMO wireless communication system according to an exemplary embodiment of the present invention.

Referring to FIG. 5, the BS includes a midamble generator 502, a scheduler 504, a precoding matrix generator 506, a data buffer 508, a plurality of encoders 510-1 to 510-N, a plurality of symbol modulators 512-1 to 512-N, a precoder 514, a plurality of subcarrier mappers 516-1 to 516-N, a plurality of OFDM modulators 518-1 to 518-N, and a plurality of Radio Frequency (RF) transmitters 520-1 to 520-N.

The midamble generator 502 generates a midamble to be transmitted to MSs. That is, the midamble generator 502 multiplies pilot signals by respective codes in a codebook and arranges the pilot signals, thereby generating the midamble. That is, the midamble generator 502 generates a reference signal by multiplying the respective codes by the pilot signals divided by a predefined number of bands. Then, the midamble generator 502 cyclically shifts the midamble by the code, thereby generating a plurality of midambles to be transmitted in each frame.

The scheduler 504 selects MSs destined for band-by-band spatial multiple access. That is, the scheduler 504 selects MSs destined for band-by-band spatial multiple access by an index of a band received from MSs and CQI of the band corresponding to the index. For example, if four MSs are selected in a specific band, the CQI of the MSs for at least four codes is required in the specific band. The scheduler 504 classifies the CQI of the MSs on a band/frame basis and selects the MSs having the best code-by-code channel quality in the same band as the MSs destined for spatial multiple access in the band. Herein, the scheduler 504 selects the MSs destined for spatial multiple access in all the bands, or selects the MSs destined for spatial multiple access in only some bands.

The precoding matrix generator 506 generates a precoding matrix for processing data streams for the MSs selected by the scheduler 504. Herein, the precoding matrix generator 506 generates the precoding matrix using the codes in the band when each of the selected MSs feeds back an index of the band. Herein, the precoding matrix is generated as shown in Equation (1) by using a matrix having codes or the Hermitian vectors of the codes as a column vector.

The data buffer 508 stores data to be transmitted to the MSs, and the scheduler 504 outputs the stored data according to the scheduling results. Each of the encoders 510-1 to 510-N encodes a bit sequence of the stream corresponding to itself. Each of the symbol modulators 512-1 to 512-N modulates the encoded bit sequence of the stream corresponding to itself, thereby generating complex symbols. Using the precoding matrix generated by the precoding matrix generator 506, the precoder 514 processes signals of the streams allocated to the MSs destined for spatial multiple access. That is, the precoder 514 multiplies the precoding matrix by the signal sequence of the streams allocated to the MSs destined for spatial multiple access.

Each of the subcarrier mappers 516-1 to 516-N maps a signal, which is to be transmitted through an antenna corresponding to itself, to a subcarrier. Herein, each of the subcarrier mappers 516-1 to 516-N maps not only the data signal provided from the precoder 514 but also the midamble provided from the midamble generator 502 and the dedicated pilot signal multiplied by the code corresponding to each MS to a subcarrier. Herein, each of the subcarrier mappers 516-1 to 516-N maps the dedicated pilot signal in an in-band mode. For example, each of the subcarrier mappers 516-1 to 516-N maps the data signal and the dedicated pilot signal as illustrated in FIG. 2.

Each of the OFDM modulators 518-1 to 518-N converts a subcarrier signal, which is to be transmitted through the corresponding antenna, into a time-domain signal through an Inverse Fast Fourier Transform (IFFT) operation, and inserts a Cyclic Prefix (CP), thereby generating an OFDM symbol. Each of the RF transmitters 520-1 to 520-N up-converts a provided baseband signal into a RF signal and transmits the RF signal through the corresponding antenna.

Figure 6:
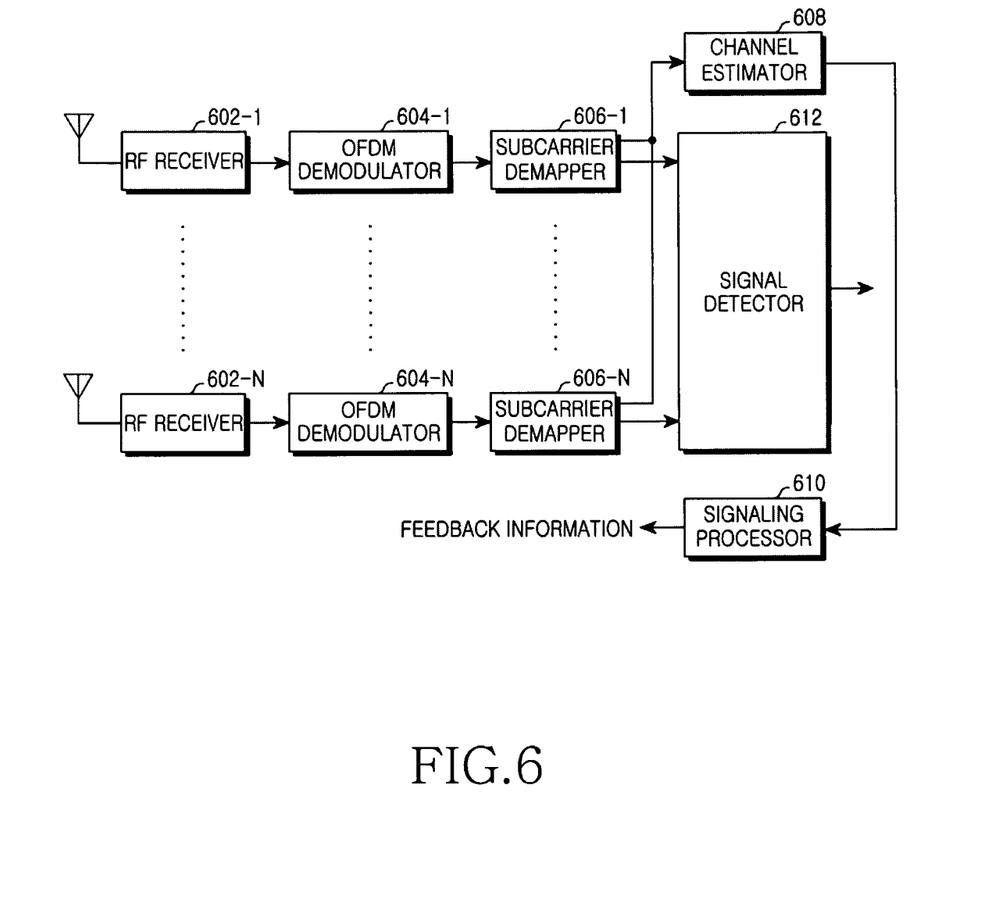
FIG. 6 is a block diagram of an MS in a MIMO wireless communication system according to an exemplary embodiment of the present invention.

FIG. 6 is a block diagram of an MS in a MIMO wireless communication system according to an exemplary embodiment of the present invention.

Referring to FIG. 6, the MS includes a plurality of RF receivers 602-1 to 602-N, a plurality of OFDM demodulators 604-1 to 604-N, a plurality of subcarrier demappers 606-1 to 606-N, a channel estimator 608, a signaling processor 610, and a signal detector 612.

Each of the RF receivers 602-1 to 602-N down-converts a RF signal received through the corresponding antenna into a baseband signal. Each of the OFDM demodulators 604-1 to 604-N divides a signal received through the corresponding antenna by the OFDM symbol and converts the same into subcarrier signals through a Fast Fourier Transform (FFT) operation.

Each of the subcarrier demappers 606-1 to 606-N classifies the subcarrier signals received through the corresponding antenna by the process unit and outputs the same to the corresponding block. For example, each of the subcarrier demappers 606-1 to 606-N outputs a data signal to the signal detector 612 and outputs a midamble and a dedicated pilot signal to the channel estimator 608.

The channel estimator 608 estimates an effective channel between a BS and an MS. For example, if a midamble is provided, the channel estimator 608 generates a band-by-band effective channel matrix and measures a band-by-band channel quality using the effective channel matrix. In addition, if the dedicated pilot signals transmitted in an in-band mode are provided, the channel estimator 608 estimates an effective channel. Then, the channel estimator 608 provides the band-by-band CQI estimated using the midamble to the signaling processor 610, and provides the effective channel information estimated using the dedicated pilot signals to the signal detector 612.

The signaling processor 610 generates control information to be transmitted to the BS. More specifically, the signaling processor 610 generates control information including the index of a band having the maximum channel quality value among the band-by-band channel quality measured using the midamble, and the CQI of the band with the maximum channel quality value.

The signal detector 612 detects signals transmitted through a stream allocated to itself, by using the effective channel estimated by the channel estimator 608. In other words, the signal detector 612 compensates distortion on the received data signal based on the estimated effective channel. For example, if a linear receiving technique is used, the signal detector 612 generates a linear receiving filter for the effective channel and multiplies the linear receiving filter by a signal sequence received through a plurality of RX antennas.

The exemplary embodiments described with reference to FIGS. 1 to 6 illustrate the use of a midamble. However, the system according to an exemplary embodiment of the present invention also supports a codebook index feedback method according to the related art. If the MS moves at a high speed or is located at the boundary area of a cell, it is efficient to apply the method according to the aforementioned exemplary embodiment using a relatively small codebook. However, if the MS moves at a low speed or is located at the center of the cell, it is efficient to feed back the codebook index using a relatively large codebook.

Therefore, by implementing spatial multiple access according to the aforementioned exemplary embodiments of the present invention, the MS may change to a method of using a relatively large sized codebook. Herein, the MS should know a channel matrix, and channel matrix information may be obtained as follows. First, the MS estimates an effective channel matrix by dedicated pilot signals. Then, the MS multiplies the effective channel matrix by an inverse matrix of a precoding matrix used in the BS, thereby obtaining the channel matrix information. This is expressed as Equation (2).

$$H_{eff}P^{-1} = (HP)P^{-1} = H \tag{2}$$

where $H_{eff}$ denotes an effective channel matrix, P denotes a precoding matrix, and H denotes a channel matrix.

Herein, the MS may detect codes applied to a midamble of the corresponding frame using a frame number. That is, the correspondence between a frame number and a code is predefined or provided from the BS, so that an MS may detect the codes applied to the midamble using the frame number. Thus, the MS detects codes applied to midambles with reference to frame numbers and then generates a precoding matrix using the codes in the same way as in the BS. The MS divides the actual channel information from the effective channel by the precoding matrix as shown in Equation (2), selects a code in a relatively large codebook by the channel matrix, and feeds back an index of the selected code to the BS. Accordingly, the BS may perform an accurate precoding operation.

In this case, the MS further includes a selector that generates a precoding matrix, obtains channel matrix information, and selects a code. In addition, the signaling processor 610 of the MS generates control information indicating an index of the selected code, which is to be fed back to the BS.

As described above, in the MIMO wireless communication system, exemplary embodiments of the present invention perform the codebook-based precoding operation using the midamble including the pilot signals multiplied by the respective codes in the codebook. Accordingly, exemplary embodiments of the present invention may reduce the computational complexity of the MS and may prevent overhead caused by codebook index feedback.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Mobile Station (MS) in a Multiple Input Multiple Output (MIMO) wireless communication system, the method comprising:
   receiving pilot signals multiplied by respective precoding codes in a codebook, the pilot signals being received through an identical time period and different frequency bands;
   measuring a band-by-band channel quality by using the pilot signals;
   feeding back Channel Quality Information (CQI) and an index of a frequency band with a maximum channel quality value to a Base Station (BS); and
   receiving data signals and dedicated pilot signals,
   wherein the dedicated pilot signals comprises a multiplication of pilot signals with one of a precoding code used in the frequency band where the index is fed back, and a Hermitian vector of the precoding code.

2. The method of claim 1, further comprising:
   estimating an effective channel by using the dedicated pilot signals; and
   detecting the data signals by using the effective channel.

3. The method of claim 2, further comprising:
   obtaining channel matrix information by multiplying an effective channel matrix by an inverse matrix of a precoding matrix used in the BS;
   selecting a precoding code in a codebook by using the channel matrix; and
   feeding back an index of the precoding code.

4. The method of claim 3, further comprising:
   detecting codes applied to the pilot signals with reference to a frame number; and
   generating a precoding matrix by using the detected codes.

5. An apparatus for a Mobile Station (MS) in a Multiple Input Multiple Output (MIMO) wireless communication system, the apparatus comprising:
   a receiver for receiving pilot signals multiplied by respective precoding codes in a codebook, the pilot signals being received through an identical time period and different frequency bands;
   an estimator for measuring a band-by-band channel quality by using the pilot signals; and
   a processor for generating control information including Channel Quality Information (CQI) and an index of a frequency band with the maximum channel quality value, which are to be transmitted to a Base Station (BS),
   wherein the receiver receives data signals and dedicated pilot signals, and
   wherein the dedicated pilot signals comprises a multiplication of pilot signals with one of a precoding code used in the frequency band where the index is fed back, and a Hermitian vector of the precoding code.

6. The apparatus of claim 5, wherein the estimator estimates an effective channel by using the dedicated pilot signals, and the apparatus further comprises a detector for detecting the data signals by using the effective channel.

7. The apparatus of claim 6, further comprising:
   a selector for obtaining channel matrix information by multiplying an effective channel matrix by an inverse matrix of a precoding matrix used in the BS, and for selecting a precoding code in a codebook by using the channel matrix,
   wherein the processor feeds back an index of the selected precoding code to the BS.

8. The apparatus of claim 7, wherein the selector detects codes applied to the pilot signals with reference to a frame number, and generates a precoding matrix by using the detected codes.

9. The method of claim 1, wherein the frequency bands allocated to the pilot signals multiplied by the respective precoding codes are cyclic shifted in every transmission.

10. The method of claim 1, wherein the MS is selected to be included spatial multiple access, with at least one other MS that feeds back the index of same frequency band at different frame.

11. The apparatus of claim 5, wherein the frequency bands allocated to the pilot signals multiplied by the respective precoding codes are cyclic shifted in every transmission.

12. The apparatus of claim 5, wherein the MS is selected to be included spatial multiple access, with at least one other MS that feeds back the index of same frequency band at different frame.

* * * * *